United States Patent [19]

Bauer

[11] 4,252,446
[45] Feb. 24, 1981

[54] MIXING HEAD FOR REACTIVE COMPONENTS

[75] Inventor: Adolf Bauer, Olching, Fed. Rep. of Germany

[73] Assignee: Krauss-Maffei Aktiengesellschaft, Münich, Fed. Rep. of Germany

[21] Appl. No.: 47,926

[22] Filed: Jun. 12, 1979

[30] Foreign Application Priority Data

Jun. 14, 1978 [DE] Fed. Rep. of Germany ....... 2825983

[51] Int. Cl.³ .................... B01F 7/16; B01F 15/02; B29D 27/02
[52] U.S. Cl. ..................... 366/177; 264/DIG. 83; 366/184; 366/194; 366/279; 366/336
[58] Field of Search ............ 366/134, 136, 137, 138, 366/150, 177, 182, 184, 189, 194, 195, 267, 269, 279, 289, 295, 336, 604; 261/DIG. 26; 422/133; 264/DIG. 83; 425/4 R, 817 R, 543

[56] References Cited

U.S. PATENT DOCUMENTS

| | | | |
|---|---|---|---|
| 3,706,515 | 12/1972 | Keuerleber et al. | 425/4 R |
| 3,799,199 | 3/1974 | Rumpff | 366/336 X |
| 4,119,304 | 10/1978 | Groom | 366/189 |

Primary Examiner—Philip R. Coe
Attorney, Agent, or Firm—Karl F. Ross

[57] ABSTRACT

A mixing head for mixtures of reactive components, e.g. two-component synthetic-resin systems to be discharged into a mold, in which the orifices for the two components open into a mixing chamber and can be selectively blocked or unblocked by a plunger or piston which serves to drive the mixture out of the chamber. According to the invention a blocking body (baffle barrier) is provided on a connecting rod which extends through the plunger and, in a retracted position of the latter, is located in the path of the jets of the reactive components emanating from the orifices.

10 Claims, 2 Drawing Figures

MIXING HEAD FOR REACTIVE COMPONENTS

FIELD OF THE INVENTION

My present invention relates to a mixing head and, more particularly, to a device for mixing two flowable and reactive components, e.g. components of a reactive mixture adapted to polymerize, harden or set in the formation of molded synthetic-resin articles.

BACKGROUND OF THE INVENTION

In the synthetic-resin molding art and elsewhere in which hardenable or settable materials are to be used or applied, it is known to use a synthetic-resin system which consists of two mutually miscible and interreactive components which are combined in a mixing head to form the settable mixture, i.e. the synthetic-resin material.

For example, in the formation of polyurethane layers, bodies and the like, it is known to react polyol and di-isocyanate components in a mixing head to form a reactive mixture which can set. Either or both of these components can include an expanding or blowing agent so that the resulting body has a cellular or foamed characteristic.

In the formation of bodies from epoxy resins, the epoxy resin on the one hand and the amine hardener on the other hand can be mixed in a mixing head to form the settable mixture.

In general, the two components which are to be combined are fed to the mixing head in liquid form and can be displaced by respective metering pumps.

In German Pat. No. 2,065,841, French Pat. No. 71 05 304, in British Pat. No. 1,334,440 and in U.S. Pat. No. 3,706,515 (particularly FIG. 3) there is described a device for generating a chemically reactive mixture from at least two components capable of forming the ultimate synthetic-resin composition which comprises a mixing chamber whose walls are formed with orifices through which the individual components are fed. The mixing chamber has an outlet opening for the reactive component mixture and a control piston or plunger is reciprocable in the mixing chamber to block and unblock the orifices and drive residual mixture from the chamber in a certain cadence or time, depending upon the molding or other requirements. The plunger itself can be controlled by fluid-responsive means and is driven linearly between mixing and nonmixing positions.

In the system of these patents, when the plunger or control piston is in its mixing position, a baffle body is disposed in the mixing chamber in the region between the inlet opening or orifices and the outlet or discharge openings of the mixing chamber.

The block body or baffle barrier of the known device serves to generate a mixing prepressure in the mixing chamber and to influence the distribution of the jets or streams of the components so that mixing is promoted. When one or both of the components includes a blowing or expanding agent, this body makes it possible, by regulating the pressure in the mixing chamber (i.e. the mixing prepressure) to control the pore structure and the external appearance of any molded body formed with the mixture.

The baffle barrier formed by the aforementioned body is drawn into the wall of the mixing chamber and out of the path of the control piston when the latter is shifted from its mixing position to its nonmixing position, i.e. blocks the orifice and drives the residual mixture out of the mixing chamber. This system requires a separate control arrangement, including a piston and cylinder for the barrier body and makes a coordination between the several control elements mandatory if reliable operation is to be achieved.

German patent document (Auslegeschrift) No. 25 44 749 discloses an adjustable baffle barrier which can be set as to its spacing from the mixing chamber. However, since this baffle barrier is located downstream of the mixing chamber in a passage communicating with the mold, control in response to movement of the control piston is not possible. In this system as well hydraulic control of the adjustment of the baffle barrier is provided.

Frequently it is desirable to avoid any use of a passage between the mixing chamber and the mold and in this case the principles of the last-mentioned publication are inapplicable.

OBJECTS OF THE INVENTION

The principal object of the present invention is to provide an improved mixing chamber which has the advantages of a system using a baffle barrier but without the disadvantages of earlier baffle barrier arrangements.

Another object of the invention is to provide an improved mixing chamber for two reactive synthetic-resin components which facilitates adjustment of a baffle barrier for controlling the mix prepressure in the mixing chamber.

Still another object of the invention is to provide an improved mixing chamber of high reliability.

SUMMARY OF THE INVENTION

These objects and other which will become apparent hereinafter, are attained in accordance with the present invention, in a mixing device or head, especially for a plurality of interreactive flowable components, e.g. liquids adapted to react to form a settable synthetic-resin and at least one of which can contain a blowing or expanding agent, which comprises a mixing chamber having an outlet along the axis of the preferably cylindrical chamber and at least a pair of orifices opening into the chamber for respective components. A control piston or plunger is axially shiftable in the chamber betwee a mixing position in which the components admitted through the orifices can mix within the chamber and from a reactive mixture, and a position (nonmixing) in which the plunger or piston block the orifices and has expelled the mixture from the chamber through the outlet.

According to the invention, in the mixing position of the control piston, a body is disposed in the chamber between the orifices and the outlet to form a baffle barrier which is connected to or mounted on an element which passes through the control piston or plunger.

Because the baffle barrier is thus mounted on the control piston, it no longer lies as a possible obstruction in the path of the control piston and it is no longer necessary to separately control and synchronize the movement of the baffle barrier with the movement of the control piston.

In the simplest case, the baffle barrier can be connected rigidly with the control piston, i.e. relative movement of the baffle barrier and the control plunger can be excluded.

However, in many cases it is desirable to advance the control piston so that its end face lies flush with the outlet of the mixing chamber to form part of the molded cavity with which this outlet communicates, i.e. the control piston is advanced to completely expel all of the mixture from the mixing chamber but does not project therebeyond. In such cases it is disadvantageous to have the baffle barrier project into the mold cavity, i.e. beyond the mouth or outlet of the mixing chamber, as would be the case if the baffle barrier were rigid with the control piston.

This problem can be eliminated, according to the invention, by making the connecting element upon which the baffle barrier is mounted movable relative to the control piston in accordance with a feature of the invention and provide means for enabling lost motion of the control piston relative to the element and baffle barrier or vice versa. Thus, in the nonmixing position of the piston the latter can receive the baffle barrier in a recess at the plunger end of the control piston while the element can engage an abutment when the piston is withdrawn into its mixing position so that the baffle barrier extends from the piston.

More particularly, a spring can bear upon a seat connected to the element or rod carrying the baffle barrier and urging the same in the direction of the abutment and the baffle barrier into to recess. When the abutment is encountered, however, the spring is compressed to permit the baffle barrier to emerge from the recess and occupy its baffle position within the mixing chamber when the baffle barrier is received in the recess, the end face of the barrier should lie flush with the end face of the control piston.

According to another feature of the invention, the abutment and/or the spring seat engageable therewith can be adjustable in the axial direction, e.g. by screwthread means, to establish the position of the baffle barrier in the mixing chamber in the mixing position of the control piston.

Advantageously the baffle barrier has a larger cross section at its free end than at its opposite end, e.g. is frustoconical with the broad base at the free end, the recess being complementary, i.e. of frustoconical configuration widening toward the outlet of the mixing chamber.

It has also been found to be advantageous to provide means for rotating the element and the baffle barrier to facilitate cleaning of the recess. In this case the element or rod may be rotated by a pneumatic or liquid-driven (hydraulic) motor.

BRIEF DESCRIPTION OF THE DRAWING

The above and other objects, features and advantages of the present invention will become more readily apparent from the following description, reference being made to the accompanying drawing in which.

SPECIFIC DESCRIPTION

Figure 1:
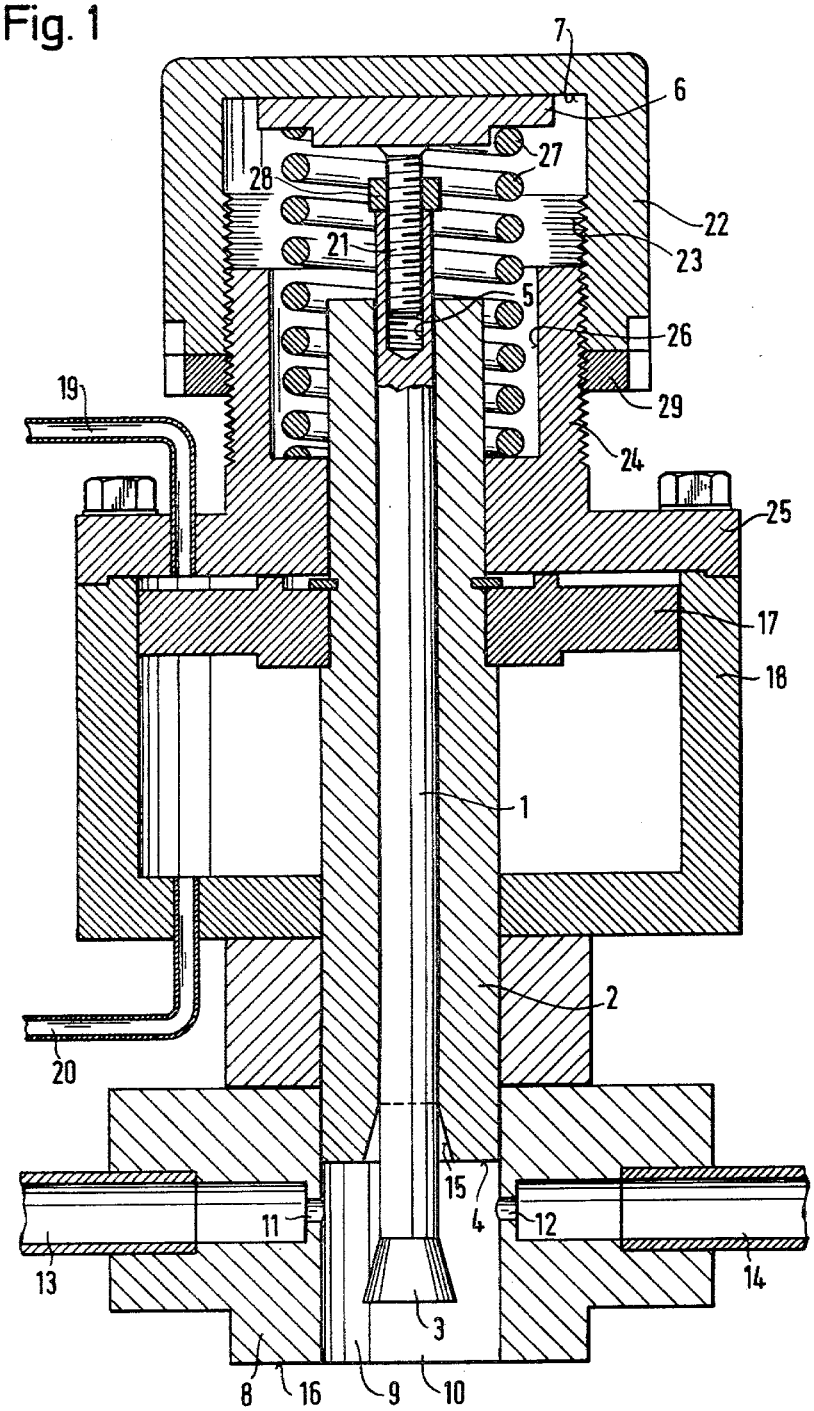
FIG. 1 is an axial cross-sectional view through a high-pressure mixing head for synthetic-resin components according to the present invention.

In the drawing I have shown a mixing head in somewhat simplified form for charging a mold with a reactive synthetic-resin mixture containing a blowing or foaming (expanding) agent, e.g. a foamable polyurethane. In such cases, it is customary to provide a mixing head with return ports which, in the nonmixing position of the piston or plunger, communicate with the inlet orifices for the two components through passages in the piston. This allows for circulation of the two components continuously in the nonmixing face. Such systems are used with the present invention but have not been illustrated in the drawing. They can, of course, be of the type described in U.S. Pat. Nos. 3,706,515 and 3,799,199.

As will be apparent from FIG. 1, respective interreactive synthetic-resin components can be forced via pumps (not shown) through the inlet conduits 13 and 14 past the orifices 11 and 12 into a cylindrical mixing chamber 9 formed in a housing 8. The orifices 11 and 12 are located diametrically opposite one another so that their jets or streams of the respective liquid components are directed toward one another for effective mixing. The mixture fills the mixing chamber 9 and flows through an outlet 10 along the axis of the chamber 9 into the cavity of a mold for example.

The mixing chamber 9 is defined at its upper end by a control piston or plunger 2 which, in FIG. 1, is shown at its mixing position.

When the desired quantity of the mixting has been introduced into the mold, the control piston 2 is driven downwardly until its end face 4 is flush with the end face 16 of the mixing chamber, thereby completely expelling the reacting mixture from the chamber 9 and constituting the piston end as part of the wall of the mold.

The downward movement of the plunger 2 into its nonmixing position, in which further entry of the components into the mixing chamber is blocked and the components are recirculated in the manner described, is effected by a piston 17 connected to the plunger 2 and received in a double-acting cylinder 18 connected to the control valve by the fluid lines 19 and 20. In the case of a downward stroke of the plunger 2, line 19 is pressurized while line 20 is drained and, for retraction of the plunger 2 into its mixing position, line 20 is pressurized and line 19 is drained. Any conventional hydraulic or pneumatic control system can be used for this purpose.

According to the invention, a frustoconical baffle barrier 3 is provided substantially in the middle of the mixing chamber 9 when the plunger 2 is in its mixing position. This baffle barrier 3 has its large diameter base at its lower end face.

The baffle barrier 3 is mounted or formed upon the end of rod-shaped connecting element 1 and in the embodiment shown in FIG. 1, is unitary (i.e. formed in one piece) therewith.

The upper end of the rod 1 is tapped with a thread 5 in which a screw 21 of a disk 6 is threadedly engaged, a counternut 28 fixing the disk 6 relative to the rod 1.

The disk 6 forms a seat for a compression spring 27 which surrounds the piston 2.

The disk 6 also acts as an abutment of the rod 1 which is engageable with a stop 7 formed by the inner face of a sleeve or cap 22 whose internal thread 23 adjustably mounts this cap on a threaded portion 24 of the cover 25 of cylinder 18. A counternut 29 prevents undesired loosening of the cap 22.

The cover 25, inwardly of the threaded portion 24 which is an axially boss, has an upwardly open axial recess 26 in which the compression spring 27 is received.

The spring 27 biases the disk 6 and the rod 1 upwardly against the stop 7.

As a consequence, the rod 1 is capable of a certain degree of lost motion relative to the plunger 1 and the position of the baffle body 3 within the mixing chamber 9 can be adjusted by the screw thread arrangement shown.

Upon movement of the plunger downwardly into its nonmixing description described, the baffle barrier 3 is held in place until the seat or recess 15 formed in the end of the piston or plunger 2 picks up the baffle barrier and entrains it downwardly against the force of spring 27. The pressure applied to piston 17 must thus take up the force of the spring as well during further downward movement. Since the recess 15 is fully complementary in configuration and size to the baffle body 3, the end face of the latter lies flush with the end face 4 as previously described.

Upon return of the plunger 2 into its mixing position, the abutment 6 engages the stop 7 to allow further upward movement of the plunger 2 to expose the baffle barrier which assumes the position shown in FIG. 1.

Figure 2:
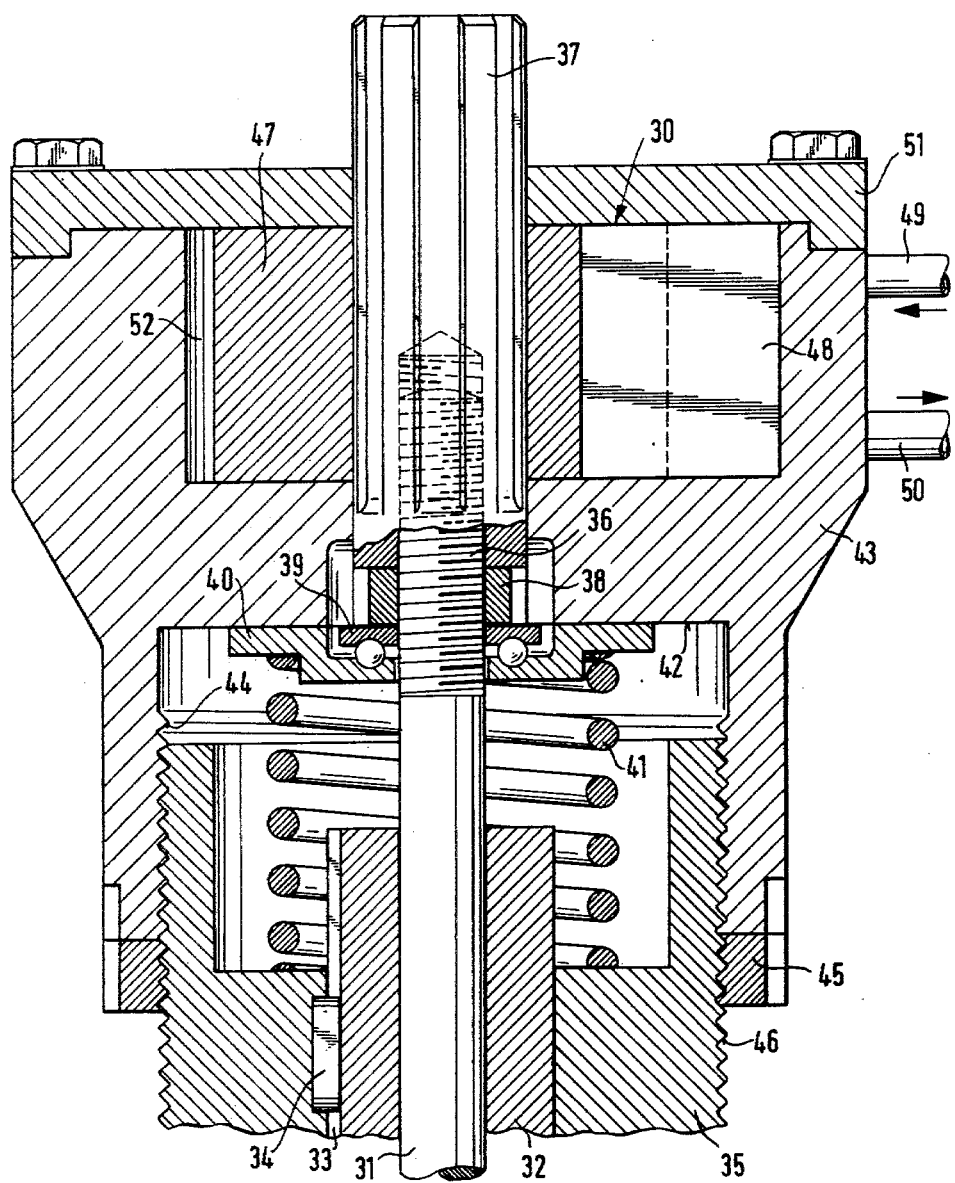
FIG. 2 is a detail axial cross-sectional view of the upper portion of a system which can be used in the arrangement of FIG. 1 for rotating the element carrying the baffle barrier as described above.

FIG. 2 shows the upper end of a mixing device which otherwise can have the structure illustrated and described in connection with FIG. 1 but which can impart rotation to the baffle body.

In this case, the rod 31 connected to the baffle body 3 (instead of the rod 1) is journaled in the plunger 32 which is held against rotation by a key 34 which slides in the keyway 34 and is mounted in the threaded boss 35 on cylinder housing 25.

The upper end of the rod 31 is formed as an externally threaded stud 36 which is screwed into the internally threaded splined shaft 37 and locked thereto by a counternut 38.

A spring 41, bearing upon the boss 35 of the cylinder housing in the manner previously described, is received in an axial recess in this boss and bears upon a disk (spring set) 49 which bears via a thrust bearing against a washer or thrust bearing race 39 upon the counternut 38. The spring 41 is effective in the same manner as the spring 27 described in connection with FIG. 1.

With upward movement of the plunger 32 the movement of the disk 40 is limited by its engagement with the stop 42 in the abutment sleeve or cap 43 which has its internal thread screwed onto the external thread 46 of the boss 35 and secured in place by the counternut 45.

The cap 43 is provided with an axially open recess formed with a cover 51 and receiving a conventional hydraulic motor 30 whose inlet and outlet conduits are represented at 49 and 50, respectively. The rotor of this motor is represented at 47 and is connected to the spline 37 to drive the spline shaft and the rod 41 in rotation. The rotor carries vanes 48 which are displaced by the pumping of hydraulic fluid through the motor.

While the relative axial movements of rod 31 and plunger 32 are the same as those for the rod 1 and plunger 2 of FIG. 1, the motor permits rotation of the rod 31 as the barrier body 3 is seated in the recess 15 to clear the latter while nevertheless allowing axial movement of the spring shaft 37 relative to the rotor 47 for the axial movement of the rod 31.

I claim:

1. A device for mixing two flowable components which comprises:

a housing formed with an axially extending mixing chamber having an outlet at an axial end thereof and at least two orifices opening into said chamber at locations spaced axially inwardly from said outlet;

a plunger axially shiftable in said housing and having an end face delimiting said chamber, said plunger being axially shiftable between a mixing position wherein said orifices discharge into said chamber to form a mixture of said components therein and a nonmixing position wherein said orifices are blocked from discharging into said chamber and said mixture is displaced from said chamber through said outlet;

means on said housing for axially displacing said plunger between said positions;

a baffle barrier in said chamber between said orifices and said outlet in said mixing position of said plunger; and an element connected to said baffle barrier and connecting same to said plunger for joint movement therewith at least over part of the axial displacement of said plunger between said positions.

2. The device defined in claim 1, further comprising means forming a lost-motion connection between said element and said piston.

3. The device defined in claim 2 wherein the means forming said lost-motion connection includes:

an abutment connected to said element remote from said baffle barrier;

a spring seated against said abutment and against said housing biasing said baffle barrier away from said outlet; and a stop juxtaposed with and engageable by said abutment in the mixing position of said plunger.

4. The device defined in claim 3 wherein said plunger is formed at said face with a recess accommodating said baffle barrier in said nonmixing position of said plunger.

5. The device defined in claim 4 wherein said baffle barrier is frustoconical and has its broad base turned toward said outlet.

6. The device defined in claim 5 wherein said recess is complementary and fully accommodates said baffle barrier whereby the end of said baffle barrier turned toward said outlet is flush with said face of said plunger in said nonmixing position of said plunger.

7. The device defined in claim 6, further comprising means for rotating said baffle barrier to clear said recess.

8. The device defined in claim 6 wherein said element is a rod extending through said plunger, said end face of said plunger is flush with a face of said housing at said outlet in said nonmixing position, said orifices are juxtaposed with one another across said chamber, and said means for displacing said plunger includes a piston-and-cylinder arrangement on said housing.

9. The device defined in claim 8 wherein said abutment is a disk forming a seat for said spline, said housing is formed with a threaded boss receiving said spring and said stop is a sleeve threaded onto said boss, said device further comprising a threaded connection joining said disk to said rod.

10. The device defined in claim 9, further comprising a fluid-operated motor connected to said rod for rotating same.

* * * * *